US008406426B2

(12) United States Patent
Stone et al.

(10) Patent No.: US 8,406,426 B2
(45) Date of Patent: *Mar. 26, 2013

(54) METHOD AND APPARATUS FOR STORING AND RETRIEVING ENCRYPTED PROGRAMMING CONTENT SUCH THAT IT IS ACCESSIBLE TO AUTHORIZED USERS FROM MULTIPLE SET TOP BOXES

(75) Inventors: Christopher J. Stone, Newtown, PA (US); Joseph F. Halgas, Jr., Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/316,130

(22) Filed: Dec. 22, 2005

(65) Prior Publication Data

US 2007/0192628 A1 Aug. 16, 2007

(51) Int. Cl.
*H04N 7/167* (2011.01)
(52) U.S. Cl. ...................................................... 380/228
(58) Field of Classification Search .................. 380/228; 725/46; 713/175; 455/411
See application file for complete search history.

(56) References Cited

U.S. PATENT DOCUMENTS

| 6,209,091 B1* | 3/2001 | Sudia et al. ................... 713/175 |
| 6,453,159 B1* | 9/2002 | Lewis ........................... 455/411 |
| 6,789,197 B1 | 9/2004 | Saito |
| 2003/0001978 A1 | 1/2003 | Smith et al. .................... 348/714 |
| 2003/0061477 A1 | 3/2003 | Kahn et al. |
| 2004/0031058 A1 | 2/2004 | Reisman |
| 2004/0068747 A1 | 4/2004 | Robertson et al. |
| 2004/0073954 A1 | 4/2004 | Bjordammen et al. ....... 725/151 |
| 2004/0078584 A1 | 4/2004 | Moroney et al. ............. 713/189 |
| 2004/0086127 A1* | 5/2004 | Candelore ..................... 380/281 |

(Continued)

FOREIGN PATENT DOCUMENTS

| EP | 1408497 A1 | 4/2004 |
| EP | 1672831 A1 | 6/2006 |

OTHER PUBLICATIONS

Balachandran, Anand et al. "Rapid video browsing on a VCR using a TV set-top box". In Proceedings of the 2000 information resources management association international conference on Challenges of information technology management in the 21st century, Anchorage, Alaska, pp. 250-254. Year of Publication: 2000 URL: http://www.cse.ucsd.edu/~abalacha/research/papers/IRMA00.pdf.

(Continued)

*Primary Examiner* — Brandon Hoffman
(74) *Attorney, Agent, or Firm* — Susan R. Payne (57) ABSTRACT

A set top box is provided that includes a receiver/tuner for receiving programming content over a broadband communications network, an encrypter/decrypter for encrypting and decrypting the programming content, and a secure memory configured to store at least a first cryptography key to be used by the encrypter/decrypter to encrypt and decrypt the programming content. The set top box also includes a digital storage medium for storing encrypted programming content, a multimedia processor operationally associated with the receiver/tuner, the decrypter, and the digital storage medium, and a user interface operationally associated with the multimedia processor. The multimedia processor is configured to: encrypt decoded programming content using the first cryptography key stored in the secure memory and uniquely associated with the set top box; store the encrypted content on the digital storage medium; encrypt the first cryptography key using a second cryptography key to form an encrypted first cryptography key; and store the encrypted first cryptography key on the digital storage medium.

16 Claims, 4 Drawing Sheets

U.S. PATENT DOCUMENTS

| | | |
|---|---|---|
| 2004/0107443 A1 | 6/2004 | Clancy |
| 2004/0165725 A1 | 8/2004 | Kumar et al. |
| 2004/0237100 A1 | 11/2004 | Pinder et al. |
| 2005/0071639 A1 | 3/2005 | Rodgers et al. |
| 2005/0076092 A1 | 4/2005 | Chang et al. |
| 2005/0100167 A1 | 5/2005 | Alve et al. |
| 2005/0144468 A1 | 6/2005 | Northcutt et al. |
| 2005/0210500 A1 | 9/2005 | Stone |
| 2005/0210507 A1 * | 9/2005 | Hawkins et al. ............... 725/46 |
| 2005/0228897 A1 | 10/2005 | Yamamoto et al. |
| 2006/0039560 A1 * | 2/2006 | Wasilewski ................. 380/228 |

OTHER PUBLICATIONS

EPC Extended Search Report, RE: Application #06847789.2-1241/1966707 PCT/US2006048449 Jun. 9, 2010.

* cited by examiner

METHOD AND APPARATUS FOR STORING AND RETRIEVING ENCRYPTED PROGRAMMING CONTENT SUCH THAT IT IS ACCESSIBLE TO AUTHORIZED USERS FROM MULTIPLE SET TOP BOXES

FIELD OF THE INVENTION

The present invention relates generally to a method and apparatus for storing programming content received by a set top box and more particularly to a method and apparatus for encrypting programs recorded by a set top box on a storage medium in an encrypted format so that they can only be accessed by authorized users, but which still allows the authorized users to access the programs using different set top boxes.

BACKGROUND OF THE INVENTION

Recent advances in cable and satellite distribution of subscription and "on-demand" audio, video and other content to subscribers have given rise to a growing number of digital set-top boxes (sometimes referred to as Digital Consumer Terminals or "DCTs") for decoding and delivering digitally broadcast programming. These boxes often include additional circuitry to make them compatible with older analog encoding schemes for audio/video distribution. As the market for digital multimedia content of this type grows and matures, there is a corresponding growth of demand for new, more advanced features.

Content owners are concerned about protecting their content when in digital form. Digital copies of content preserve their quality through subsequent copying, unlike analog copies. Digital content is available through terrestrial broadcast, digital cable, satellite, and the Internet. In some cases, the digital content is protected during transport, but in other times it is not. For example, digital cable uses conditional access technology to protect video programs during transport, but terrestrial broadcast television has no encryption of the video programs.

A natural extension of on-demand programming is a personal video/audio recorder (PVR) capability whereby desired programming (e.g., a "broadcast" movie, program, audio recording, etc.) can be recorded to a storage medium (e.g., HDD) and played back later.

However, the potential unauthorized copying of stored content poses a significant problem for content providers and MSO's (Multiple Service Operators). Since the programs stored on a PVR may be considered to be valuable, it is desirable to protect the content on the disk from unauthorized access, either by the subscriber or by others who might come into possession of the set-top box. To overcome this problem the programs are often stored on the storage medium in an encrypted form using a private encryption key that is unique to each and every set top box. The private encryption key is often stored in a secure hardware portion of the set top box so that it is available to encrypt and decrypt the stored programs. Unfortunately, one problem with this approach is that if the set top box should fail so that the private encryption key is not able to be accessed, the programs stored in the storage medium cannot be decrypted even though the storage medium itself may be intact and the data otherwise accessible. Another problem with this approach is that it prevents a storage medium that is used to record programs with one set top box from being used with another set top box to play back or render the programs. This effectively limits the portability of the storage medium, which is a particularly noteworthy limitation when the storage medium is an external storage medium that is generally intended to be used with a variety of different rendering devices. For instance, a hard disk drive (HDD) may be connected to the set top box via an I/O interface (e.g. SATA) on the set top box. The HDD may be easily detached from the set top box by the user without opening the set top box enclosure and, likewise, easily attached to a second set top box.

Accordingly, it would be desirable to provide a method and apparatus for encrypting programs recorded by a set top box on a storage medium in an encrypted format so that they can only be accessed by authorized users, but which still allows the authorized users to access the programs using different set top boxes. Furthermore, it would also be desirable if the method and apparatus allowed an MSO to remove an internal storage medium (i.e. a storage medium physically mounted within the enclosure of the set top box) containing encrypted programs from a non-operational set top box and install it in a new set top box so that the new set top box allows the authorized users to access the programs from the new set top box.

DETAILED DESCRIPTION

Figure 1:
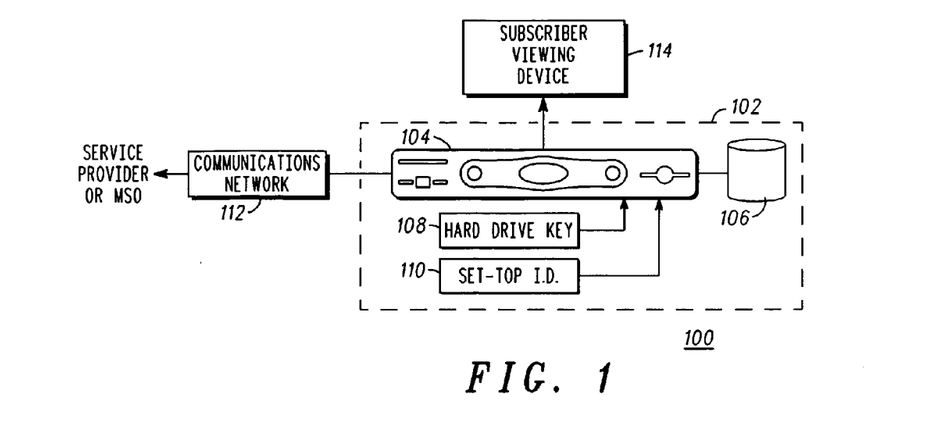
FIG. 1 is a block diagram of a communications system that includes a set top box having a digital storage medium to provide PVR type functionality.

FIG. 1 is a block diagram of a communications system 100 that includes a set top box 104 having a digital storage medium 106 to provide PVR type functionality. The digital storage medium 106 (e.g., a hard disk drive—"HDD") may be either internal or external to the set-top box 104 and is used for storing program content.

The set-top box 104 is connected via a communications network 112 to a service provider or MSO that provides broadcast and/or subscription program content. Typically, the communications network 112 is a cable, hybrid fiber/coax or satellite transmission network. Network 112 could, alternatively, employ any other suitable communication links, such as a wired and/or wireless broadband Internet, local area network (LAN), or wide area network (WAN) connection. Program content from the service provider is decoded and, if the content is encrypted, then the content is decrypted by the set-top box for viewing, listening or otherwise rendering on a subscriber's rendering device 114 (e.g., television, media center, stereo system, personal computer, handheld device, etc.).

A cryptography key 108, which may be a symmetric private key, is associated with and unique to the set-top box 104. The symmetric private key 108 is stored in a manner that makes it substantially inaccessible to "hackers" by placing it in a secure, protected storage area. One example of secure, protected storage is the on-chip PROM or FLASH memory of a microcontroller chip that can be programmed to make read-out of data stored therein impossible except by internal access by the microcontroller itself. This type of secure storage capability exists in many modern microprocessors and micro-controllers as protection against unauthorized duplication of sensitive data or program information. Another example of secure, protected storage is PROM or FLASH memory external to a microprocessor chip but internal to the set-top box 104. Although not quite as secure as the internal protected memory of a microprocessor chip, such PROM and FLASH memory is sufficiently difficult for a subscriber or hacker to access that it provides a considerable barrier to accessing the contents thereof. The symmetric private key 108 is not listed anywhere on the box and is not stored in any place that is accessible to a subscriber or hacker. The symmetric private key 108 will hereinafter from time to time also be referred to as the hard drive key 108.

A set-top identifier 110 is also associated with and unique to the set-top box 104. The set-top identifier 110, however, is not necessarily hidden from the subscriber. It can be printed on the outside of the set-top box 104 and/or can be accessible to the MSO/service-provider by electronic query of the set-top box 104. Typically, the set-top identifier 110 will be a network address or a serial number. The set-top identifier 110 and the hard drive key 108, while both unique to the set-top box 104, are mathematically orthogonal (independent of one another). That is, the hard drive key 108 cannot be derived from the set-top identifier 110 and vice-versa by any mathematical process or algorithm. Typically, the hard drive key 108 will be based upon an arbitrarily assigned number developed independently of the set-top identifier 110.

In some cases the hard drive key 108 is not stored directly in the secure, permanent memory of the set-top box, but is derived (computed) by executing a secure algorithm on another unique identifier that is stored in the secure, protected storage of the set top box 104. For clarity of discussion in what follows the unique identifier and the hard drive key will be assumed to be one and the same.

Figure 2:
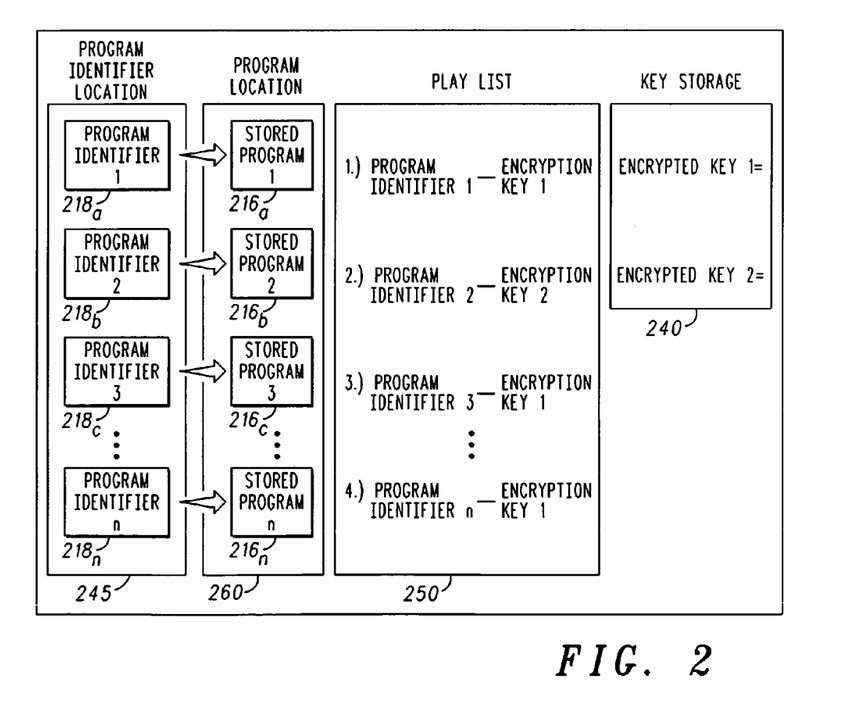
FIG. 2 is a block diagram showing the logical organization of the digital storage medium seen in FIG. 1.

Each separate item of stored program content is referred to as a "program" and has its own program identifier derived from information uniquely identifying it. This arrangement is illustrated in FIG. 2, which is a block diagram showing the logical organization of the digital storage medium 106. As shown, one or more programs 216 (e.g., programs 216a, 216b, 216c . . . 216n) is stored in encrypted form and each has an associated program identifier 218 (e.g., program identifiers 218a, 218b, 218c . . . 218n) that uniquely identifies it. The program identifiers 218 are stored on the digital storage medium 106 along with the stored programs 216. In FIG. 2, the encrypted content 216 is stored in program location 260 and the program identifiers 218 are stored in program identifier location 245. Alternatively, the program identifiers 218 can be stored elsewhere in another storage medium in the set-top box 104.

As described in more detail below, an encryption scheme is employed whereby stored program content is encrypted using the hard drive key 108 that is unique to set top box 104. The hard drive key 108 itself is then encrypted by a second cryptography key that is supplied by the MSO, the service provider, or the set top box manufacturer. The second cryptography key may also be a symmetric private key. The second key is common to some or all of the set top boxes associated with the supplier (e.g. an MSO has a symmetric key that is unique to the MSO but is common to the set top boxes owned by the MSO, or a set top box manufacturer has a symmetric key that is unique to the manufacturer but is common to the set top boxes built by the manufacturer) such that all set top boxes associated with the supplier use the same key owned by the supplier.

Figure 3:
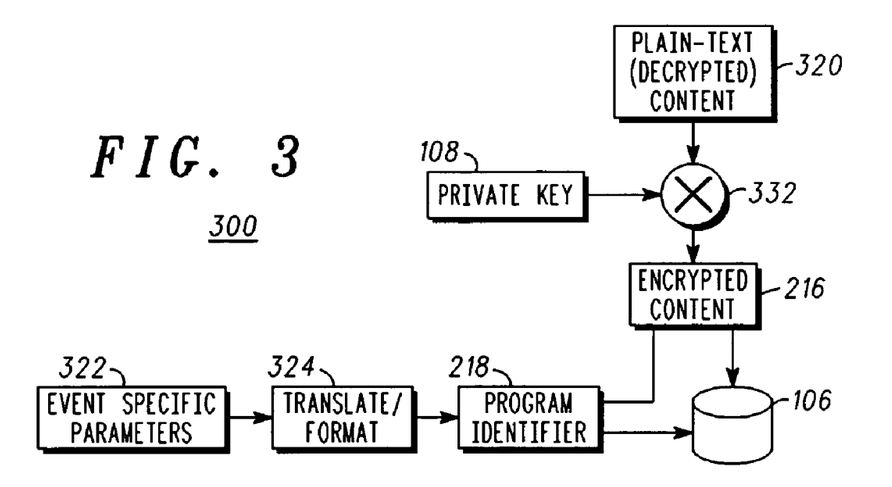
FIG. 3 is a data flow diagram illustrating the process of encrypting a program for storage in a set-top box using a hard drive key.

FIG. 3 is a data flow diagram 300 illustrating the process of encrypting a program 320 for storage in a set-top box/PVR 104 using hard drive key 108. When a subscriber wishes to record (store) an event, a translation/formatting algorithm 324 processes parameters 322 associated with a program requested by the subscriber to produce program identifier 218. Typically, the parameters 322 will be something unique to the program request such as the date and time of the request. Other information such as content identifying information (title, program identifier, length, format, etc.) could also be used, provided that it is unique and will not be duplicated by a similar event request. The translation/formatting process 324 simply organizes and formats the parameters into a simple identifier: the program identifier 218. The hard drive key 108 is used to encrypt plain-text (unencrypted/decrypted) content 320 via an encryption algorithm 332 to produce encrypted content 216. The encryption algorithm may be any suitable encryption algorithm such a Triple-DES algorithm (a standard process for encryption by applying the DES—Data Encryption Standard—three times in succession). The encrypted content 216 is then stored in the storage medium 106 along with the program identifier 218 used to identify it.

Figure 4:
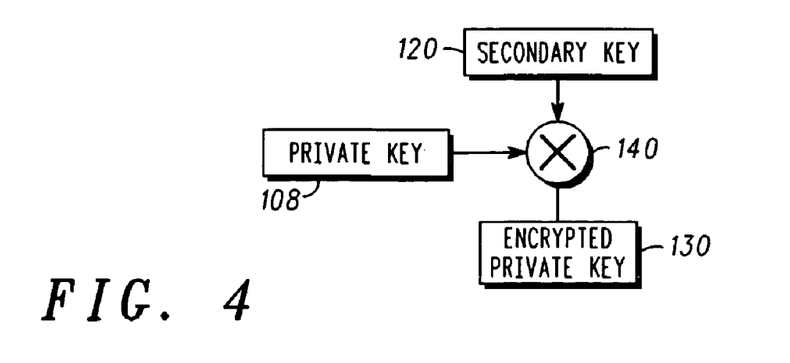
FIG. 4 is a data flow diagram illustrating the process of encrypting the hard drive key using a second key to form an encrypted hard drive key.

Next, as shown in FIG. 4, the hard drive key 108 itself is encrypted using the aforementioned second key 120 and encryption algorithm 140 to form encrypted hard drive key 130. The encryption algorithm 140 used to encrypt the hard drive key may or may not be the same as the encryption algorithm used to encrypt the content 320. As shown in FIG. 2, the encrypted hard drive key 130 may be stored on the digital storage medium 106 in key storage location 240 so that it is available to anyone having access to the contents of digital storage medium 106. A playlist 250 is also located on the storage medium 106. The playlist 250 may be needed if different programs have been encrypted with different hard drive keys, which may occur, for example, if an external storage medium is used with multiple set top boxes. The playlist 250 associates each individual program (using the program identifiers 218) with the particular encrypted key 130 that corresponds to the particular hard drive key 108 used to encrypt that program. For instance, in the example shown in FIG. 2, programs 1, 3 and n have been encrypted using the hard drive key that has been encrypted as encrypted key 1. Likewise, program 2 has been encrypted using a different hard drive key that has been encrypted as encrypted key 2.

Since the encrypted programs stored on the storage medium 106 and the unique hard drive key (or keys) 108 necessary to decrypt those programs are all stored on the same storage medium, they are both available even if the storage medium 106 is removed from the particular set top box 104 that was used to encrypt and store the programs. In this way the programs stored on the set top box are in principle still accessible even without the availability of the set top box that was used to record them. However, before the encrypted programs can be decrypted, the encrypted hard drive key 130 itself must be decrypted using the second key 120 to obtain the unique hard drive key 108. The second key 120 is made available to a subscriber or other user, however, only upon authorization from the provider or holder of the second key (e.g., the MSO, the service provider, or the set top box manufacturer).

One advantage of this arrangement is that the information that is unique to a given set top box and which is necessary to decrypt the content on the storage medium 106—the hard drive key 108—is always available to anyone in possession of the storage medium 106. As a result, if the set-top box 104 should fail so that the hard drive key 108 located in a secure, protected storage area of the set top box 104 is not retrievable, then the storage medium 106 can be removed and installed in a new set top box. The new set box has its own unique hard drive key, which cannot be used to decrypt the content previously stored on the storage medium 106 by the original set top box 104. Nevertheless, the original hard drive key 108 will still be available since it is located on the storage medium 106, albeit in an encrypted form. If the hard drive key 108 were not available in this manner, the content located on the storage medium 106 would be inaccessible since it could not be decrypted. The encrypted hard drive key 108 can only be accessed, however, upon authorization from the appropriate party who provides the user with access to the second key.

The aforementioned scenario assumed that the hard drive key 108 was unavailable because of a failure in the set top box 104. The hard drive key 108 may be rendered unavailable in a variety of other circumstances as well. For example, the storage medium 106 may be an external storage medium 106 that can be used with multiple set top boxes. In this scenario if the hard drive key for each set top box is only available in its respective secure protected storage area, the content stored on the external storage medium 106 could only be decrypted by the same set top box that also encrypted and stored the content on the external storage medium 106, thus limiting the value of the medium's portability. That is, in a conventional encryption arrangement if the external storage medium 106 is used with a different set top box, it will not be able to retrieve content previously stored by another set top box.

The second key 120 needed to encrypt and decrypt the hard drive key 108 can be provided to set top box 104 in a variety of different ways. For example, the second key 120 can be stored in the set top box 104 at the time of its manufacturer. The second key 120 can be stored in the same secure protected storage area as the hard drive key 108 or in other secure hardware in the set top box 104. Alternatively, the second key 120 can be delivered to the set top box 104 when it is first in communication with the service provider or MSO at the time it is first connected to the communications network 112. In this case the second key 120 may be delivered in a secure manner using, for example, the conditional access system associated with the service provider or MSO, a well-known internet protocol (e.g. IPSec, SSL, DSL, etc.), or a communication based protocol (e.g. DOCSIS Baseline Privacy Plus (BPI+)). The conditional access system permits only eligible set-top boxes to receive and access the information that is being transmitted.

In yet another alternative, the second key 120 can be delivered to the set top box 104 on a single use (i.e., on-demand) basis. That is, the set top box sends a request to the service provider or MSO when it needs access to the second key. After determining that the set top box 104 is authorized to receive the second key (perhaps by checking the service tier of the subscriber's service plan, for example), the service provider or MSO forwards the key to the set top box 104. After the second key 120 is used for the sole purpose for which its use has been authorized (e.g., decrypting a particular program a predefined number of time), the key 120 is discarded by the set top box 104.

In summary, the second key 120 can be installed in the set top box 104 at the time of its manufacture or delivered to the set top box 104 by the service provider or MSO, either when the set top box 104 is first placed in communication with the communications network 112 or on an on-demand basis.

Regardless of whether the second key is initially provisioned in the set-top box 104 or subsequently delivered to the set top box 104, the set top box 104 must be authorized to use the second key 120 for encryption and/or decryption purposes. In some cases a blanket, unlimited authorization may be provided. In this case, since the second key 120 is always available, the set top box 104 can always record and play back or otherwise render any content that is desired without restriction. Such unlimited access may only be useful when the MSO or service provider is willing to allow unlimited access to content without an additional fee. In other cases authorization may be provided by the service provider or MSO over the communications network 112 on a one time basis so that from then on the set top box 104 has unlimited access to the content, or, alternatively, authorization may be provided on a single use or other limited use basis (e.g., an on-demand basis). In the former case the set top box 104 can always decrypt and render content from the time at which authorization is received. This case may be applicable, for example, if and when a subscriber increases his or her subscription service tier. In the latter case the set top box can only render a program a predetermined number of times (or possibly an unlimited number of times for a limited time period), which can be used for instance, when playing a recording of a program that was distributed as a pay-per-view event.

Figure 5:
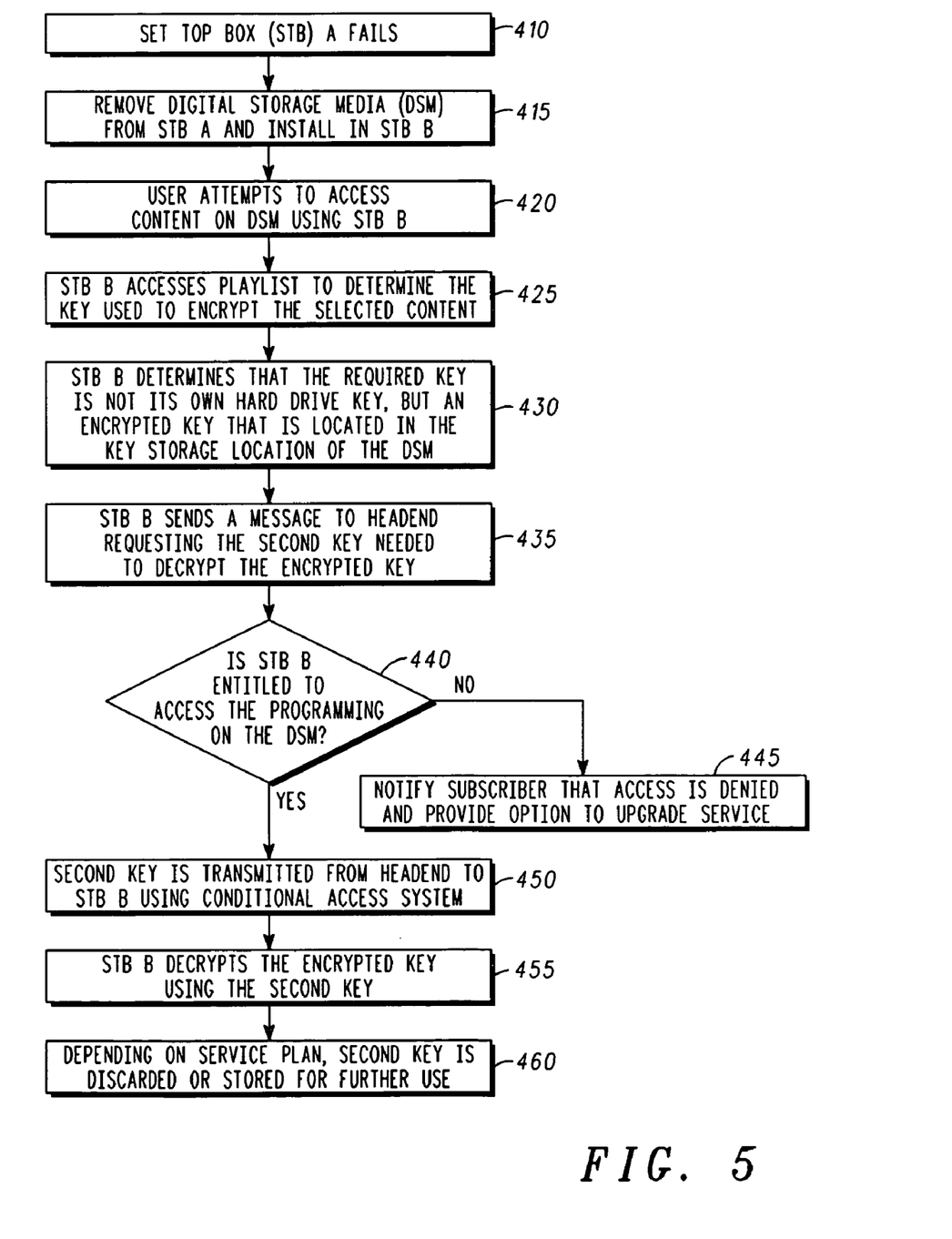
FIG. 5 is a flowchart depicting a process by which a digital storage medium is transferred from a failed set top box to another set top box

FIG. 5 is a flowchart depicting an example of how a digital storage medium located in a set top box that has failed is transferred to another set top box that is used to access the content on the digital storage medium. In this example, set top box A is the original set top box that has failed and its digital storage medium is transferred to set top box B. It should be noted that in this example, the second key is not stored in the set top box B but is provided to set top box B by the service provider (MSO) via the communication network. In this example it is assumed that set top box A at some previous time has had access to the second key to encrypt its hard drive key, after which the second key was discarded.

The process begins in step 410 when set top box A fails. In step 415 the digital storage medium is removed from set top box A and installed in set top box B, presumably by a service technician. The subscriber attempts to render the content on the digital storage medium using set top box B in step 420. In response to the subscriber's request, set top box B accesses the playlist in step 425 to determine the key that was used to encrypt the selected content. In step 430 set top box B determines that the required key is not its own hard drive key, but an encrypted key that is located in the key storage area of the digital storage medium. Assuming that the second key needed to decrypt the encrypted key is not internally located in set top box B, in step 435 set top box B sends a message to the headend requesting the second key needed to decrypt the encrypted key. Alternatively, the second key can be installed in set top box B at the time of its manufacture or delivered to set top box B by the service provider or MSO, either when set top box B is first placed in communication with the communications network. A determination is made in step 440 if set top box B is entitled to access the programming on the digital storage medium. If not, then the process continues with step 445 in which the headend notifies the subscriber that access is denied. The headend may also provide the subscriber with the option to upgrade his or her service so that the programming on the digital storage medium can be accessed. If the subscriber is entitled to access the programming, or if the subscriber obtains the necessary service upgrade, the second key is transmitted from the headend to set top box B in step 450 using the conditional access system or other secure means. Set top box B then accesses the encrypted key from the digital storage medium and decrypts it using the second key in step 455, thereby making the programming available to the subscriber. Finally, depending on the particular system implementation or subscriber's service plan, in step 460 the second key is discarded or stored for future use.

Figure 6:
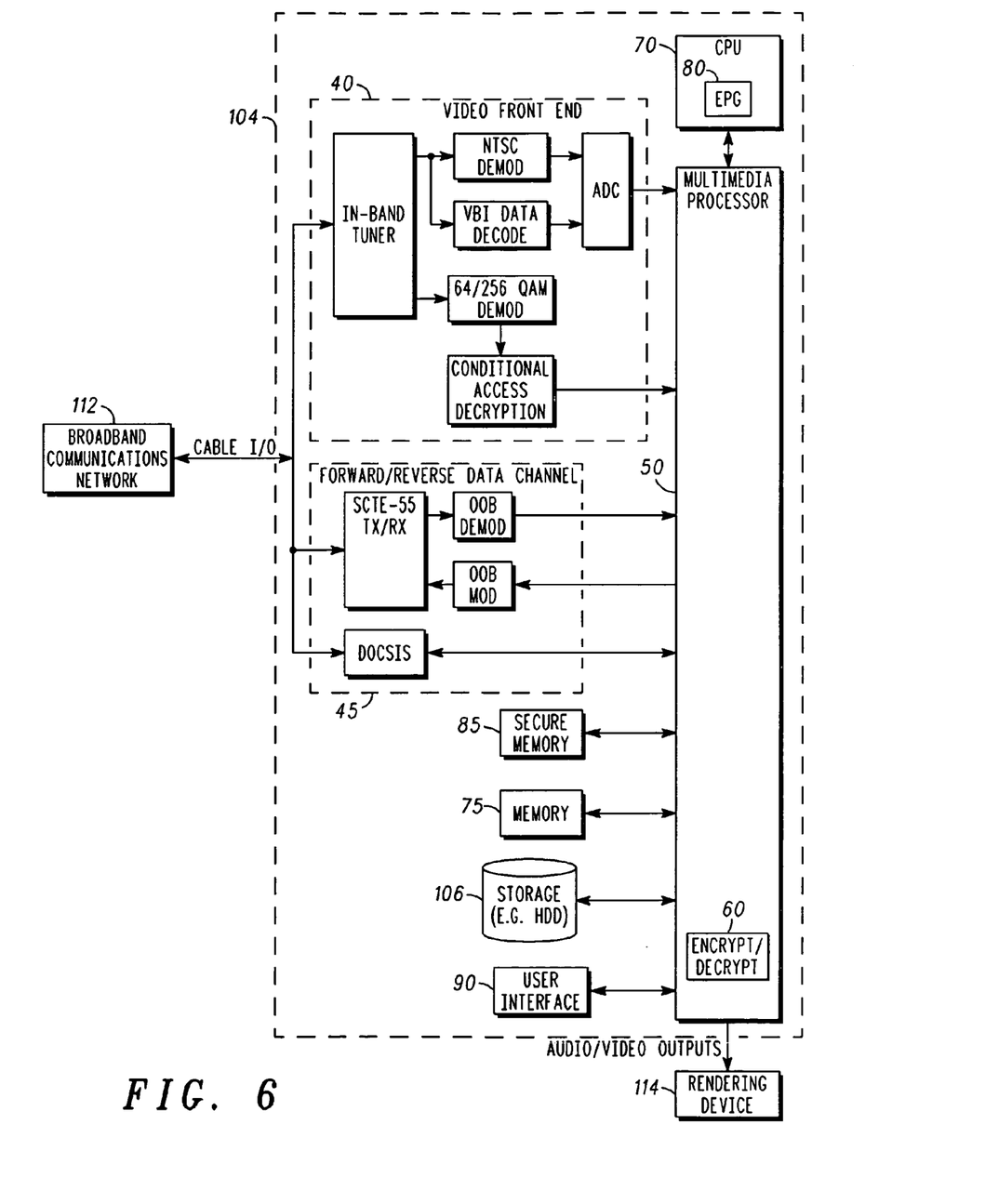
FIG. 6 is a block diagram of an illustrative set top box.

One example of set top box 104 is shown in more detail in FIG. 6. It should be noted that set top box 104 more generally may be any apparatus such as a hardware card, specially programmed computer or other device having the functionality described herein that may be placed near to or within a television or other display device (such as a computer monitor) such as rendering device 114 seen in FIG. 1. The set top box 104 receives content from broadband communications network 112 seen in FIG. 1. The received content is fed to video front end 40. The forward/reverse data channel 45 provides an appropriate connection to the corresponding communication path, where an appropriate connection path may be one of but is not limited to DOCSIS, SCTE-55-1, or SCTE-55-2. The primary function of the video front end 40 is to select or tune a channel within the spectrum of content being fed to the set top box 104, decode and if necessary decrypt the content and provide the content, in digital format, to the multimedia processor 50. An example of a well-known multimedia processor is the Broadcom BCM-7038.

A multimedia processor 50 is connected to the video front end 40 and routes the content to encrypter/decrypter 60, which encrypts the content on to the storage device 106. If the content is being viewed in real time via a live off disk (LOD) session, then the multimedia processor 50 routes the content back off of the storage device 106 through the encrypter/decrypter 60, which decrypts the content. The multimedia processor 50 decodes the decrypted content and presents the content to the rendering device 114. If the content is being recorded on the storage device 106 for later playback by the user, then the process terminates when the content is routed to the storage device 106. The multimedia processor 50 is controlled by processor 70. The encrypter/decrypter 60 includes circuitry that contains the encryption/decryption algorithm. The encrypter/decryper 60 circuitry employs the hard drive key 108 stored in secure memory 85 and which, as previously mentioned, may also be used to store second key 120. Conventional decoding processes such as MPEG1, MPEG2, MPEG4, AVC, VC1, and H.264 are examples of such decoding processes.

An electronic program guide (EPG) 80 may be present, which stores information concerning available content for the near future. This information may be updated on a periodic basis so that the consumer can make appropriate selection for upcoming programs. The EPG 80 receives updates from the forward/reverse data channel 45 or from the video front end 40. The electronic program guide 80 may display information on the rendering device 114. The electronic program guide 80 may be downloaded to the set top box 104 utilizing the forward/reverse data channel 45 or the video front end 40.

The user interface 90 may include various control devices such as a keypad connected directly to the set top box 104 or a remote control device. The user interface 90 permits the user to interact with the set top box 104 and electronic program guide 80 and thereby select content for recording and on-demand playback.

The storage medium 106 is connected to the multimedia processor 50 as well as the processor 70. The encrypter/decrypter 60 is resident within the multimedia processor 50 to enhance the robustness of the encryption/decryption process. The encrypted/decrypter 60 may be external to the multimedia processor 50 and connected via a local bus, serial bus or other bus/connection architecture. The storage medium 106 may also be directly connected to the rendering device 114. The storage medium 106 may include one or more hard disk drives and/or other types of storage devices including solid state memory devices such as chips, cards, or sticks. The storage medium 106 may also include magnetic tape, magnetic or optical disk, and the like. The storage medium 106 is configured to store the content depicted in FIG. 2.

The processor 70 is connected to multimedia processor 50. Software running on the processor 70 is used to control the multimedia processor, which in turn controls the storage medium 106, the encrypter/decrypter 60, the video front end 40, as well as the user interface 90. In general, the control unit 70 coordinates all of the operations performed by the set top box 104 by interaction with the multimedia processor 50, which in turn sends appropriate control signals to each of the various components. For example, the control unit 70 controls the recording of the content on the storage medium 106 by controlling the multimedia processor 50 which, in turn controls the process by synchronizing the sending/receiving of data between the storage medium 106 and the encrypter/decrypter 60.

It will be understood that the functions of the various components of the set-top box 104 shown in FIG. 6 may be carried out using hardware, software, firmware, or any combination thereof. That is, the particular functional elements set forth in FIG. 6 are shown for purposes of clarity only and do not necessarily correspond to discrete physical elements.

The process shown in FIG. 5 may be implemented in a general, multi-purpose or single purpose processor. Such a processor will execute instructions, either at the assembly, compiled or machine-level, to perform that process. Those instructions can be written by one of ordinary skill in the art following the description of FIG. 5 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

Although various embodiments and examples are specifically illustrated and described herein, it will be appreciated that modifications and variations are covered by the above teachings and are within the purview of the appended claims. For example, while encryption keys that are employed have been described in terms of symmetric keys, asymmetric keys may be used as well.

The invention claimed is:

1. At least one non-transitory computer-readable medium encoded with instructions which, when executed by processors of a first set top box and a second set top box, performs a method comprising:
   in the first set top box:
   encrypting content received and decrypted by the first set top box, the encrypting using a first cryptography key uniquely associated with the first set top box;
   storing the encrypted content on a digital storage medium;
   encrypting the first cryptography key using a second cryptography key that is stored in a secure protected storage location in the first set top box to form an encrypted first cryptography key; and
   storing the encrypted first cryptography key on the digital storage medium;
   in the second set top box, to which the digital storage medium has been installed after being removed from the first set top box:

determining that the content is not encrypted using a cryptography key uniquely associated with the second set top box;

sending a request to obtain the second cryptography key to a third party; and receiving and using the second cryptography key to decrypt the encrypted first cryptography key.

2. The least one non-transitory computer-readable medium of claim 1 wherein at least one of the first and second cryptography keys is a symmetric cryptography key.

3. The least one non-transitory computer-readable medium of claim 1 wherein at least one of the first and second cryptography keys is an asymmetric encryption key.

4. The least one non-transitory computer-readable medium of claim 1 wherein the third party is one of a multiple services operator and a service provider.

5. The least one non-transitory computer-readable medium of claim 1 wherein the second cryptography key is installed in the secure, protected storage location by a manufacturer of the set top box.

6. The at least one non-transitory computer-readable medium of claim 1 wherein the received content comprises at least one program and further comprising, in the first set top box:

generating a program identifier based on program specific information pertaining to the program and storing the program identifier on the digital storage medium;

generating a playlist that specifies an association between the program identifier and the encrypted first cryptography key, wherein the playlist specifies at least one other program identifier that is associated with an encrypted cryptography key; and storing the playlist on the digital storage medium.

7. The at least one non-transitory computer-readable medium according to claim 1, wherein the first and second cryptography key are orthogonal to each other.

8. The at least one non-transitory computer-readable medium according to claim 1, wherein the first cryptography key is stored in a secure protect storage location.

9. A tangible non-transitory computer-readable medium encoded with instructions which, when executed by a processor, performs a method comprising:

determining if programming content stored on a digital storage medium is not encrypted using a first cryptography key uniquely associated with the set top box;

if the content is not encrypted using the first cryptography key, acquiring from a third party over a communications network a second cryptography key for decrypting an encrypted third cryptography key that was used to encrypt the content, wherein the encrypted third cryptography key is stored on the digital storage medium;

decrypting the encrypted third cryptography key with the second key; and decrypting the content using the third cryptography key.

10. The non-transitory computer-readable medium of claim 9 wherein at least one of the first, second and third cryptography keys is a symmetric cryptography key.

11. The non-transitory computer-readable medium of claim 9 wherein at least one of the first, second and third cryptography keys is an asymmetric decryption key.

12. The non-transitory computer-readable medium according to claim 9, wherein the first and third cryptography keys are orthogonal to each other.

13. The non-transitory computer-readable medium according to claim 9, wherein the third cryptography key is stored in a secure protect storage location.

14. A set top box comprising:

a receiver/tuner for communicating with a third party over a broadband communications network;

an encrypter/decrypter for encrypting and decrypting program content;

a secure memory configured to store at least a first cryptography key that is uniquely associated with the set top box;

a digital storage medium for storing encrypted programming content;

a multimedia processor operationally associated with the receiver/tuner, the decrypter, and the digital storage medium; and a user interface operationally associated with the multimedia processor, wherein the multimedia processor is configured to:

accept a user input that requests rendering of program content stored on the digital medium;

determine if the program content is encrypted using the first cryptography key uniquely associated with the set top box;

if the program content is not encrypted using the first cryptography key, acquiring from the third party over the communications network a second cryptography key for decrypting an encrypted third cryptography key that was used to encrypt the content, wherein the encrypted third cryptography key is stored on the digital storage medium;

decrypting the encrypted third cryptography key with the second key;

decrypting the program content using the third cryptography key; and rendering the program content.

15. The set top box according to claim 14, wherein the first and third cryptography keys are orthogonal to each other.

16. The set top box according to claim 14, wherein the third cryptography key is stored in a secure protect storage location.

* * * * *